United States Patent

[11] 3,594,081

| [72] | Inventor | Werner Tschink<br>Nassauische Str. 4, 1 Berlin, 31, Germany |
|---|---|---|
| [21] | Appl. No. | 773,083 |
| [22] | Filed | Nov. 4, 1968 |
| [45] | Patented | July 20, 1971 |

[54] ADJUSTABLE ILLUMINATING DEVICE
17 Claims, 4 Drawing Figs.

[52] U.S. Cl. .................................................. 355/67,
353/82, 353/94, 353/99, 355/71
[51] Int. Cl. ....................................................... G03b 27/70
[50] Field of Search ............................................ 355/67, 71;
353/82, 94, 99

[56] References Cited
UNITED STATES PATENTS
3,155,001  11/1964  Sites............................ 355/66 X
3,212,396  10/1965  Schnardt et al................ 355/66 X

*Primary Examiner*—John M. Horan
*Assistant Examiner*—Richard A. Wintercorn
*Attorney*—Karl F. Ross ABSTRACT: An illuminating device, particularly for photographic copying and enlarging, includes a multiplicity of striplike, relatively inclined mirrors for the reflection of a light beam onto a translucent window. The mirrors divide the beam into a multiplicity of ray bundles which can be selectively intercepted, in whole or in part, by individual light shields interposable in their path; a plurality of such shields are disposed in closely adjoining or overlapping relationship between any pair of adjacent mirrors to intercept rays incident upon one mirror and rays reflected by the other mirror of the pair.

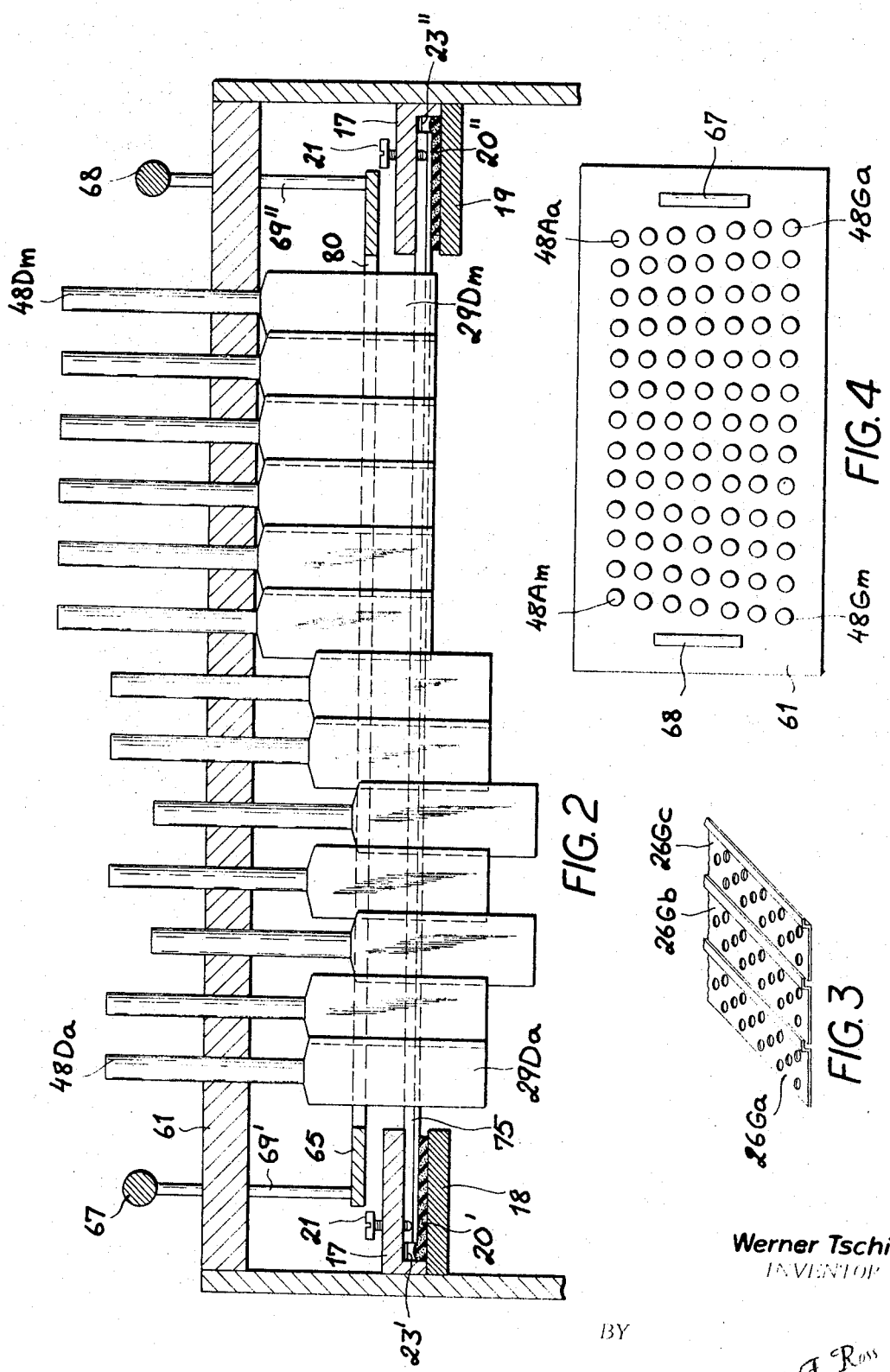

ADJUSTABLE ILLUMINATING DEVICE

My present invention relates to an illuminating device wherein light from a source inside an enclosure falls upon a translucent or semitransparent window, such as a ground glass plate, for the translumination of a photographic negative, color slide or other transparency to be copied, viewed or enlarged.

Conventional light boxes of this description provide substantially uniform illumination over the entire surface of the light-diffusing window. In many instances, however, it is desirable to decrease the intensity of the diffused light at selected window areas in order to compensate for unequal exposure of the original negative or to give prominence to certain parts of the picture. The expedient of using for this purpose an array of individual lamps within the enclosure, adapted to be selectively dimmed or turned off, affords only a rather coarse light distribution pattern and requires complex electrical circuitry. The presence of a multiplicity of light sources also increases the probability of failure of individual lamps whose replacement within the enclosure is time consuming and whose nonfunction may go unnoticed for a while, thereby disturbing the selected illumination pattern.

The general object of my invention, therefore, is to provide an improved illuminating device for the purpose set forth which avoids the aforestated drawbacks and, while using only a single light source, affords a high degree or resolution and a wide range of intensity adjustment for a desired light pattern.

This object is realized, pursuant to my present invention, by the provision of reflecting means in the housing or enclosure surrounding the preferably punctiform light source; a multiplicity of independently displaceable light shields, of greater or less opacity, are individually interposable in the paths of different bundles of light rays which are directed by the reflecting means onto respective areas of the translucent or semitransparent window whereby the intensity of illumination of these areas can be selectively varied.

According to a more specific feature of my invention, the reflecting means comprises a set of elongate, generally parallel mirrors separated by narrow gaps and inclined at different angles for illuminating contiguous areas of the window, the gaps serving to accommodate the movable light shields. The latter, advantageously, are a set of closely juxtaposed tongues within each gap, the effective width of each tongue along the gap being substantially equal to the width of the adjoining mirrors transverse to the gap so that each plate controls an approximately square section of the window surface. With the striplike mirrors disposed at acute angles to the direction of incidence of light rays from the source, the light shields should be movable in planes substantially bisecting the angles between the directions of incident and reflected light rays so as effectively to cut off, when extended, rays incident upon one mirror and rays reflected by the other mirror of a pair of mirrors flanking the corresponding gap.

The above and other features of my invention will become more fully apparent from the following detailed description of a representative embodiment, reference being made to the accompanying drawing in which:

FIG. 2 is a cross-sectional view taken on the line II—II of FIG. 1;

FIG. 3 is a perspective detail view; and

FIG. 4 is a front view of the device taken in the direction of arrow IV of FIG. 1.

Figure 1:
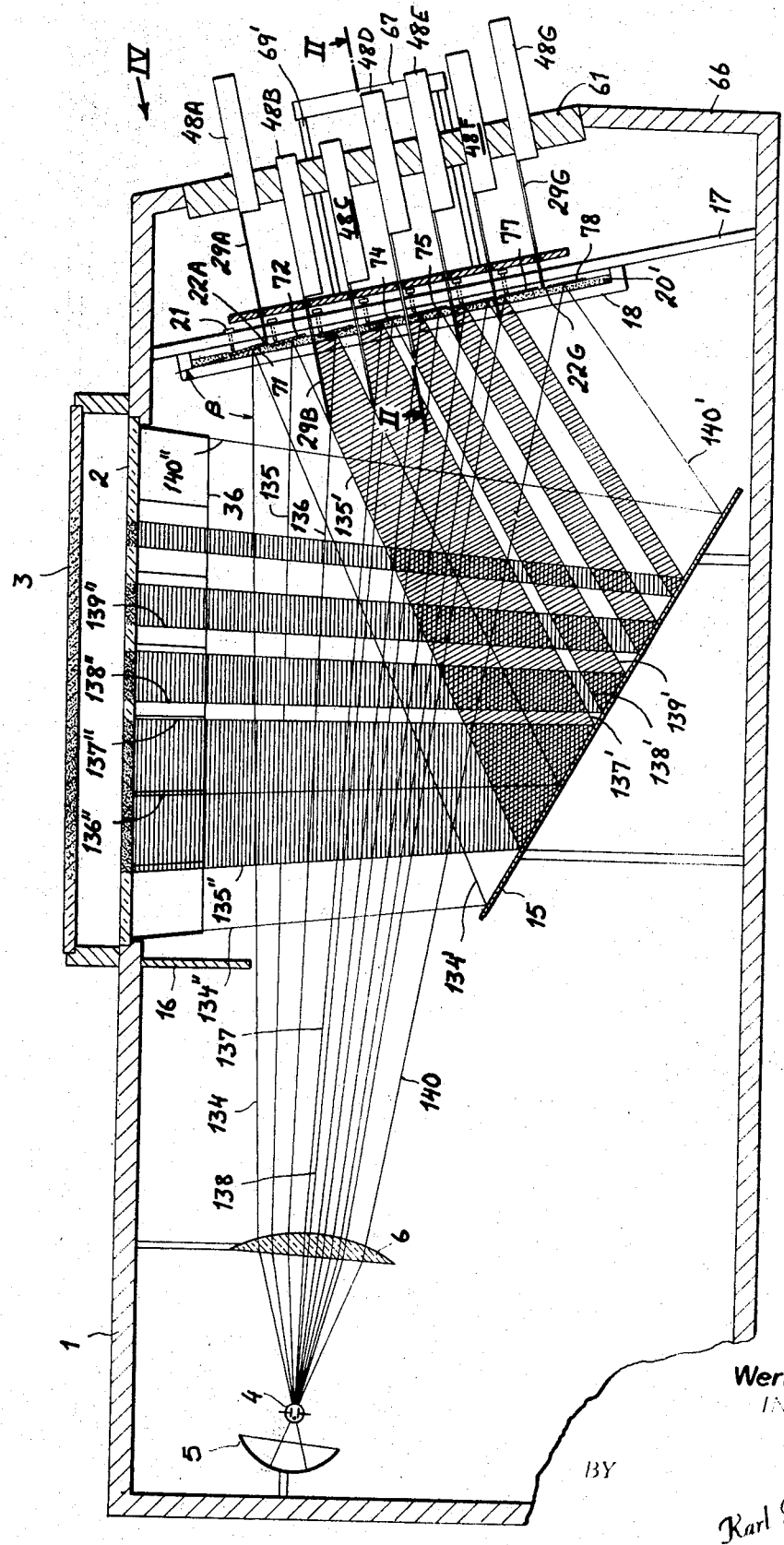
FIG. 1 is a longitudinal sectional view of an illuminating device according to the invention.

The device shown in the drawing comprises a housing 1, with blackened inner walls, whose top contains a window formed by two transversely spaced parallel translucent plates 2 and 3. A point source of light 4, such as an arc lamp, is disposed inside enclosure 1 between a spherically concave reflector 5 and a collective lens 6 which concentrates the radiation from source 4 into a beam of slightly diverging rays. These light rays impinge upon an assembly of generally parallel, elongate mirrors 71, 72, 73, 74, 75, 76, 77 and 78 whose rectangular shape is apparent from FIG. 2 which shows the mirror 75 over its entire length.

The optically ineffective ends of mirrors 71—78 are adjustably supported on a mounting frame 17 provided with a pair of lateral bars 18, 19 which carry resilient strips 20', 20'', e.g. of foam rubber. Pins 23' and 23'' pivotally support each mirror, in the vicinity of its lower edge, on the frame 17 so that its upper edge rests against the cushions 20' and 20'', the angle of inclination of the mirror with reference to frame 17 being determined by a pair of screws 21 which urge the upper edge of the mirror into contact with these cushions with greater or less deformation of the foam material according to the desired angle. The angles of inclination of all the mirrors 71—78 are so chosen that the oncoming beam is reflected onto a further, larger mirror 15 acting as a common reflector for all the light rays from the eight adjustable mirrors; mirror 15 directs these light rays onto the translucent plate 2 which is shielded from direct illumination by a baffle 16. A grating 36, consisting of thin opaque blades lying in diverging planes parallel to the incidentlike rays, further shields the window 2, 3 from stray illumination.

The mirrors 71—78 are separated by narrow gaps 22A—22G which, however, are not reproduced at the receiving plate 2 since the mutual inclination of these mirrors is such that the mirrors normally illuminate contiguous rectangular zones of the plates.

Slidably disposed within each gap 22A—22G are respective sets of light shields generally designated 29A—29G. Each of these sets, as particularly illustrated in FIG. 2 for the set 29D in gap 22D, consists of a multiplicity of closely juxtaposed tongues, here specifically 13 tongues which in the case of set 29D have been designated 29Da ... 29Dm. These tongues are provided with individual handles 48Da ... 48Dm passing through holes in a panel 61 which forms part of the front wall 66 of housing 1; the seven sets of handles have been generally designated 48A—48G in FIG. 1. FIG. 4 illustrates the complete array of 91 handles including handles 48Aa at upper right, 48Am at upper left, 48Ga at lower right and 48Gm at lower left. These handles can be individually depressed, to a greater or less extent, for displacing the associated tongues between a retracted position, e.g. as shown for tongue 29Dm, to a partly or fully extended position as illustrated for tongues 29Da and 29Dc, respectively. The tongues of each set pass through a respective slot 80 in an otherwise solid plate 65, extending parallel to frame 17, which is mounted on two pairs of lateral pins 69', 69'' traversing the panel 61; the pins 69' and 69'' are spanned by external handle bars 67 and 68 enabling the operator to pull the plate 65 toward the panel 61, the plate then bearing upon the inner ends of all the handles 48Aa—48Gm to retract the corresponding tongues into their inoperative positions. To enable selective darkening of certain areas of the illuminated window 2, 3, resetting element 65 is moved back toward frame 17 as illustrated in FIGS. 1 and 2.

It will be noted that the relative inclination of frame 17 and mirror 15 is such as to make the path lengths for all light rays from lens 5 to plate 2 substantially equal within a plane of symmetry represented by the plane of the paper in FIG. 1. Thus, any two beam segments with the same vertex angle α within that plane, such as the ray bundles bounded by rays 135, 136 and by rays 136, 137, will illuminate zones of substantially identical widths on plate 2 if the light shields in their paths are fully retracted. The mirrors 71—78, however, intercept these ray bundles at different distances from the source 4—6 so that these mirrors should slightly increase in width, from the top mirror 71 to the bottom mirror 78, in order to project uniformly wide luminous zones upon the plate 2. For the same reason, the effective width of the tongues should progressively increase from the top set 29A to the bottom set 29G, thus resulting in a slightly trapezoidal handle array as seen in FIG. 4.

Moreover, the angle of incidence $\beta$ of the rays upon mirrors 71—78 progressively decreases toward the bottom of the array, as does of course the corresponding angle of reflection. With the tongues 29A—29G disposed so as substantially to bisect the angle $\pi-2\beta$ between incident and reflected rays, the progressively increasing slant of these rays has the result that a given displacement of a lower tongue from its retracted position intercepts a larger proportion of its assigned ray bundle than does a like advance of an upper tongue. For this reason it may be desirable to reduce, progressively, the mean opacity of these tongues from the top set 29A to the bottom set 29G, e.g. by providing the surfaces of these tongues with a pattern of more or less numerous slits or holes as illustrated in FIG. 3 for the tongues 29Ga, 29Gb and 29Gc of the bottom set; in this way, the operator can gauge the degree of darkening of a particular window area by the extent of depression of the corresponding handles 48A—48G irrespectively of the position of these handles within the array of FIG. 4. Naturally, the lower tongues may also be progressively foreshortened and provided with correspondingly lengthened handles, acting as end stops, so that the effectiveness of each tongue set in its fully extended position is limited to obstructing the bundle of rays reflected from the lower half of the adjoining upper mirror and rays trained upon the upper half of the adjoining lower mirror, i.e. the mirrors 74 and 75 in the case of tongues 29D. The intersecting blades of grating 36 advantageously extend along the boundaries of the generally square areas of plate 2 controlled by the respective tongues.

Thus, as illustrated in FIG. 1, tongues 29A and 29G are fully retracted so as not to interfere with the marginal rays 134, 134', 134'' and 140, 140', 140'' incident upon mirrors 71—78, reflector 15 and plate 2. A tongue 29B is shown fully extended to intercept a ray bundle partly reflected by mirror 72 and partly trained upon mirror 73, defined by boundary rays 135, 135', 135'' and 136, 136', 136''; an adjoining tongue 29C is similarly extended to intercept a contiguous ray bundle (mirrors 73 and 74) bounded by rays 136, 136', 136'' and 137, 137', 137''. A tongue 29D is only partly extended to intercept a narrower bundle defined by boundary rays 138, 138', 138'' and 139, 139', 139''.

As further illustrated in FIG. 3, the adjoining tongues of a set (here the set 29G) are disposed in slightly overlapping, imbricate relationship without, however, touching one another.

The presence of two translucent plates 2 and 3, whose separation may be on the order of 3 cm., softens the contrasts between adjoining dark and light areas to provide for a smoother transition.

The device herein disclosed may be used directly for enlargement by interposing a negative or a slide in the path of the diverging light rays beyond lens 6 and making the plate 2 transparent, with removal of plate 3 and deposition of a film or copy paper on the plate 2 for illumination with selective intensity control. In similar manner, with omission of one of the two translucent plates 2, 3, the device may be adapted for the direct viewing of interposed color slides.

I have found that, in a practical realization of the embodiment described and illustrated, the contrast between lights and shadows (i.e. between areas corresponding to fully retracted and fully extended tongues) may reach a ratio of 17:1 for their respective luminous intensities; this somewhat exceeds the usual requirements for copying and enlargement purposes.

The punctiform light source 4 could be replaced by a linear light source, such as a rod-shaped fluorescent lamp, extending parallel to the major dimension (here horizontal) of the array in which case the reflector 5 and the lens 4 should be of cylindrical rather than spherical curvature.

I claim:

1. An illuminating device comprising a housing provided with a window including a pair of transversely spaced parallel translucent plates; a light source in said housing emitting a beam of light; reflecting means in said housing confronting said light source for directing different bundles of light rays from said beam unto respective areas of said window; and a multiplicity of independently displaceable light shields individually interposable in the paths of said bundles for selectively varying the intensity of illumination of said areas.

2. A device as defined in claim 1, wherein said reflecting means comprises a set of elongate, generally parallel mirrors separated by narrow gaps and inclined at different angles for illuminating contiguous rectangular zones of said window, said light shields being disposed in said gaps.

3. An illuminating device comprising a housing provided with a window; a light source in said housing emitting a beam of light; reflecting means in said housing confronting said light source for directing different bundles of light rays from said beam unto respective areas of said window; and a multiplicity of independently displaceable light shields individually interposable in the paths of said bundles for selectively varying the intensity of illumination of said areas; said reflecting means including a set of elongate, generally parallel mirrors separated by narrow gaps and inclined at different angles for illuminating contiguous rectangular zones of said window, said light shields being disposed in said gaps, and a common reflector for all light rays reflected by said mirrors.

4. A device as defined in claim 3 wherein said mirrors are disposed at acute angles to the direction of incidence of light rays from said source, said light shields being movable in planes substantially bisecting the angles between the directions of incident and reflected light rays.

5. A device as defined in claim 3, wherein said light source comprises a punctiform radiation emitter, a concave reflector for said radiation on one side of said light source, and lens means on the other side of said light source for concentrating said radiation into a beam of diverging rays.

6. A device as defined in claim 3, wherein said window includes a pair of transversely spaced parallel translucent plates.

7. A device as defined in claim 3, further comprising a grating adjacent said window inside said housing, said grating consisting of thin opaque strips lying in planes parallel to the directions of light rays impinging upon said window from said reflecting means.

8. An illuminating device comprising a housing provided with a window; a light source in said housing emitting a beam of light; reflecting means in said housing confronting said light source for directing different bundles of light rays from said beam unto respective areas of said window; and a multiplicity of independently displaceable light shields individually interposable in the paths of said bundles for selectively varying the intensity of illumination of said areas; said reflecting means including a set of elongate, generally parallel mirrors separated by narrow gaps and inclined at different angles for illuminating contiguous rectangular zones of said window, said mirrors being disposed at acute angles to the direction of incidence of light rays from said source, said light shields being mounted in said gaps and movable in planes substantially bisecting the angles between the directions of incident and reflected light rays.

9. A device as defined in claim 8, wherein said light shields are a set of closely juxtaposed tongues within each gap, the effective width of each tongue along the gap being substantially equal to the width of the adjoining mirrors transverse to the gap.

10. A device as defined in claim 9, wherein said effective width increases for successive sets of tongues with decreasing angle of incidence of said light rays.

11. A device as defined in claim 9, wherein the average opacity of said light shields decreases for successive sets of tongues with increasing angle of incidence of said light rays.

12. A device as defined in claim 9, wherein said tongues overlap one another within each gap in imbricate relationship.

13. A device as defined in claim 9 wherein said tongues are provided with individual handles projecting outwardly from said housing for manual displacement.

14. A device as defined in claim 13, further comprising a common resetting element engageable with all said handles and accessible from outside said housing.

15. A device as defined in claim 8, wherein said mirrors are provided with mounting means including a frame, resilient strip means on said frame, and adjusting means urging an edge of each mirror into contact with said strip means to an extent determining the angle of inclination of the respective mirror relative to said frame.

16. An illuminating device comprising a housing provided with a window; a light source in said housing emitting a beam of light; reflecting means in said housing confronting said light source for directing different bundles of light rays from said beam unto respective areas of said window; a multiplicity of independently displaceable light shields individually interposable in the paths of said bundles for selectively varying the intensity of illumination of said areas; and a grating adjacent said window inside said housing, said grating consisting of thin opaque strips lying in planes parallel to the directions of light rays impinging upon said window from said reflecting means.

17. A device as defined in claim 16, wherein said reflecting means further comprises a common reflector for all light rays reflected by said mirrors.